(12) United States Patent
Ai et al.

(10) Patent No.: US 11,520,824 B2
(45) Date of Patent: Dec. 6, 2022

(54) METHOD FOR DISPLAYING INFORMATION, ELECTRONIC DEVICE AND SYSTEM

(71) Applicant: BEIJING DAJIA INTERNET INFORMATION TECHNOLOGY CO., LTD., Beijing (CN)

(72) Inventors: Shuming Ai, Beijing (CN); Fujia Liu, Beijing (CN)

(73) Assignee: Beijing Dajia Internet Information Technology Co., LTD., Beijing (CN)

( * ) Notice: Subject to any disclaimer, the term of this patent is extended or adjusted under 35 U.S.C. 154(b) by 0 days.

(21) Appl. No.: 17/147,975

(22) Filed: Jan. 13, 2021

(65) Prior Publication Data

US 2021/0334325 A1 Oct. 28, 2021

(30) Foreign Application Priority Data

Apr. 23, 2020 (CN) .......................... 202010328915.0

(51) Int. Cl.
*G06F 16/78* (2019.01)
*G06F 16/735* (2019.01)
*G06F 16/9535* (2019.01)

(52) U.S. Cl.
CPC ........ *G06F 16/7867* (2019.01); *G06F 16/735* (2019.01); *G06F 16/9535* (2019.01)

(58) Field of Classification Search
CPC .... G06F 16/335; G06F 16/337; G06F 16/435; G06F 16/787; G06F 16/7867
See application file for complete search history.

(56) References Cited

U.S. PATENT DOCUMENTS

| 8,122,020 | B1 * | 2/2012 | Donsbach | G06Q 30/0631 |
| | | | | 707/732 |
| 10,042,505 | B1 * | 8/2018 | Bingham | G06F 16/7867 |
| 2007/0078714 | A1 * | 4/2007 | Ott, IV | G06Q 30/0273 |
| | | | | 705/14.69 |
| 2007/0118802 | A1 | 5/2007 | Gerace et al. | |
| 2011/0145219 | A1 * | 6/2011 | Cierniak | G06F 16/9535 |
| | | | | 707/723 |

(Continued)

FOREIGN PATENT DOCUMENTS

| CN | 106446007 A | 2/2017 |
| CN | 108595679 A | 9/2018 |

(Continued)

OTHER PUBLICATIONS

Chinese Office Action dated Mar. 25, 2021, from application No. 202010328915.0, 39 Pages.

*Primary Examiner* — James E Richardson
(74) *Attorney, Agent, or Firm* — Foley & Lardner LLP (57) ABSTRACT

The disclosure relates to a method for displaying information, device, system, electronic device, and storage medium. The method includes acquiring, user tag of a user account in response to a trigger operation on an information page, the user tag corresponding to one or more types of media files of the user account. The method includes displaying the user tag on the information page. The method includes displaying an associated user account corresponding to the user tag in response to an operation of selecting target user tag from the user tag.

20 Claims, 5 Drawing Sheets

---

One or more user tags of a user account associated with the information page are acquired, in response to a trigger operation on an information page. — S11

The user tag of the user account is displayed on the information page. — S12

Associated user account corresponding to a target user tag is displayed, in response to an operation of selecting the target user tag from the one or more user tags. — S13

(56) References Cited

U.S. PATENT DOCUMENTS

| | | | | |
|---|---|---|---|---|
| 2012/0166457 A1* | 6/2012 | Ross | ............... | G06F 16/9535 |
| | | | | 707/755 |
| 2012/0317198 A1* | 12/2012 | Patton | ............. | G06F 16/9537 |
| | | | | 709/204 |
| 2013/0226865 A1* | 8/2013 | Munemann | ........ | G06F 3/0482 |
| | | | | 707/609 |
| 2015/0186366 A1* | 7/2015 | Yan | ................. | G06F 16/248 |
| | | | | 707/741 |
| 2015/0302098 A1* | 10/2015 | Hern | ................ | G06F 21/41 |
| | | | | 707/708 |
| 2016/0037227 A1* | 2/2016 | Benn | ................ | G06F 16/435 |
| | | | | 725/53 |

FOREIGN PATENT DOCUMENTS

| | | |
|---|---|---|
| CN | 108600818 A | 9/2018 |
| CN | 109960763 A | 7/2019 |
| CN | 110276014 A | 9/2019 |
| CN | 110516175 A | 11/2019 |
| CN | 112612949 A * | 4/2021 |
| WO | WO-2007/056378 A3 | 5/2007 |

\* cited by examiner

METHOD FOR DISPLAYING INFORMATION, ELECTRONIC DEVICE AND SYSTEM

CROSS REFERENCE TO RELATED APPLICATION

The present application is based upon and claims the priority of Chinese Patent Application No. 202010328915.0, titled "METHOD FOR DISPLAYING INFORMATION, DEVICE, SYSTEM, ELECTRONIC DEVICE AND STORAGE MEDIUM" filed on Apr. 23, 2020. The entire content of this Chinese patent application is incorporated herein by reference.

TECHNICAL FIELD

The disclosure relates to the field of internet technology, and in particular to methods for displaying information, devices, systems, clients, servers, electronic devices, and storage media.

BACKGROUND

In Internet short video applications, some tags representing basic user information can be displayed on the user's personal homepage. Examples of user information include but are not limited to, age, constellation, geographic location, and so on. Other users can learn about the user by browsing user information presented in the tags.

SUMMARY

The present disclosure provides a method, a device, a system for displaying information, and a client, a server, an electronic device, and a storage medium.

According to a first aspect of the implementations of the present disclosure, a method for displaying information includes acquiring one or more user tags of a user account associated with an information page, in response to a trigger operation on the information page. The one or more user tags correspond to one or more types of media files of the user account. The method further includes displaying the one or more user tags on the information page and displaying associated user account corresponding to a target user tag in response to an operation of selecting the target user tag from the one or more user tags.

According to a second aspect of the implementations of the present disclosure, a method for displaying information includes acquiring tag request including an identifier of a user account, and generating and returning one or more user tags of the user account according to the tag request; or, acquiring account request including an identifier of a target user tag in the one or more user tags, and generating and returning associated user account corresponding to the user tag according to the account request.

According to a third aspect of the implementations of the present disclosure, a device for displaying information includes a first acquisition module, configured to acquire one or more user tags of a user account associated with an information page, in response to a trigger operation on the information page, and the one or more user tags corresponding to one or more types of media files of the user account, a first display module, configured to display the one or more user tags of the user account on the information page, and the first display module being further configured to display, associated user account corresponding to a target user tag in response to an operation of selecting the target user tag from the one or more user tags.

According to a fourth aspect of the implementations of the present disclosure, a device for displaying information includes a second acquisition module, configured to acquire tag request including an identifier of a user account, and a generation module, configured to generate and return one or more user tags of the user account according to the tag request; or, the second acquisition module, configured to acquire account request including an identifier of a target user tag in the one or more user tags, and the generation module, further configured to generate and return associated user account corresponding to the user tag according to the account request.

According to a fifth aspect of the implementations of the present disclosure, a client is provided, the client including the device according the third aspect.

According to a sixth aspect of the implementations of the present disclosure, a server is provided, the server including the device according the fourth aspect.

According to a seventh aspect of the implementations of the present disclosure, a system for displaying information is provided, the system for displaying information including a client and a server. The client includes the device according the third aspect and the server includes the device according the fourth aspect.

According to an eighth aspect of the implementations of the present disclosure, an electronic device is provided. The electronic device includes one or more processors, and a memory for storing processor-executable instructions. The one or more processors are configured to execute the instructions to implement the method for displaying information according to the first aspect and/or the second aspect.

According to a ninth aspect of the implementations of the present disclosure, a non-transitory storage medium is provided. When instructions in the storage medium are executed by a processor of an electronic device, the electronic device is caused to perform the method for displaying information according to the first aspect and/or the second aspect.

According to a tenth aspect of the implementations of the present disclosure, a computer program product is provided, the computer program product including program—readable code, which can be executed by a processor of an electronic device to implement the method for displaying information according to the first aspect, or the second aspect, or the first aspect and the second aspect.

It should be understood that the above general description and the following detailed description are only example and explanatory, which does not limit the present disclosure.

BRIEF DESCRIPTION OF THE DRAWINGS

The drawings herein are incorporated into the specification and constitute a part of the specification, illustrating implementations conforming to the disclosure, and together with the specification are used to explain the principle of the disclosure, and do not constitute an improper limitation of the disclosure.

DETAILED DESCRIPTION

In order to enable those of ordinary skill in the art to better understand the technical solutions of the disclosure, the technical solutions in the implementations of the disclosure will be described clearly and completely with reference to the accompanying drawings.

It should be noted that the terms "first" and "second" in the specification and claims of the disclosure and the above-mentioned drawings are used to distinguish similar objects, and not necessarily used to describe a specific sequence or order. It should be understood that the data used in this way can be interchanged under appropriate circumstances so that the implementations of the disclosure described herein can be implemented in a sequence other than those illustrated or described herein. The implementation manners described in the following example implementations do not represent all implementation manners consistent with the disclosure. Rather, they are only examples of devices and methods consistent with some aspects of the disclosure as detailed in the appended claims.

Figure 1:
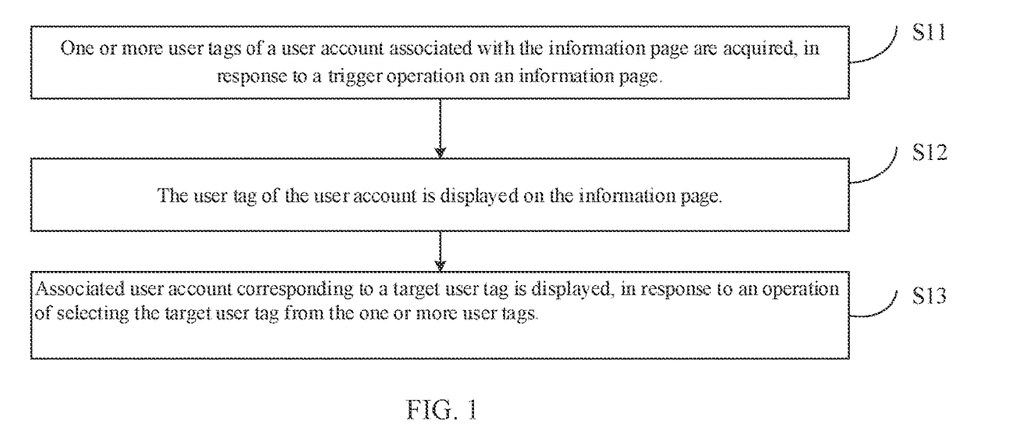
FIG. 1 is a flow chart showing a method for displaying information according to example implementations.

FIG. 1 is a flow chart showing a method for displaying information according to example implementations. As shown in FIG. 1, the method for displaying information can be applied to a client. The client can be a client with a short video application.

In block S11, one or more user tags of a user account associated with the information page are acquired, in response to a trigger operation on an information page.

In an implementation of the disclosure, the client may provide the information page, and the information page may be used to display at least one user account associated with the information page.

In an implementation of the disclosure, the user of the client terminal can perform a trigger operation on the information page. In practical applications, the trigger operation may include, but is not limited to, a sliding operation and a clicking, such as left and right sliding operation and a single-clicking. The information page can be entered by the trigger operation on the information page.

The acquired user tag of the user account may correspond to a type of media file of the user account. For example, if the user account has media file of two file types, user tags corresponding to the two file types can be acquired.

In block S12, the user tag of the user account is displayed on the information page.

In the implementation of the disclosure, the user tag of the user account can be displayed on a tag display area of the information page, for example, at the top of the information page. Because the user tag can indicate the type of the media file published by the user account, a user at the client can learn, from the information page, the user tag corresponding to the type of the media file published by the user account, and know the user account based on the type of the media file published by the user account.

In block S13, associated user account corresponding to a target user tag is displayed, in response to an operation of selecting the target user tag from the one or more user tags.

In the implementation of the disclosure, the user tag acquired and displayed above may be one or more, which may be specifically determined according to the number of type of media file published by the user account. The target user tag can be selected, by the user at the client, from one or more user tags, and then the associated user account corresponding to the user tag can be displayed. The associated user account may indicate user account information that has the same target user tag as the user account.

In the implementation of the disclosure, by acquiring the user tag of the user account associated with the information page in response to a trigger operation on the information page to display, in view of the media file published by the user account, the relating account information of the user account can be accurately provided by using the user tag corresponding to the type of the media file of the user account, which enriches the information display form. At the same time, by displaying the associated user account corresponding to the user tag in response to the operation of selecting the user tag of the user account, the associated user account can be recommended based on the type of media file corresponding to the target user tag, which satisfies social interest caused by the media file, and promoting high-quality social interaction between user accounts.

In an example implementation of the disclosure, when the above block S11 is performed, generated user tag of the user account may be read in response to the trigger operation on the information page, or the user tag of the user account may be generated in real time. In other words, the user tag can be generated in advance, or generated in real time when entering the information page.

Figure 2:
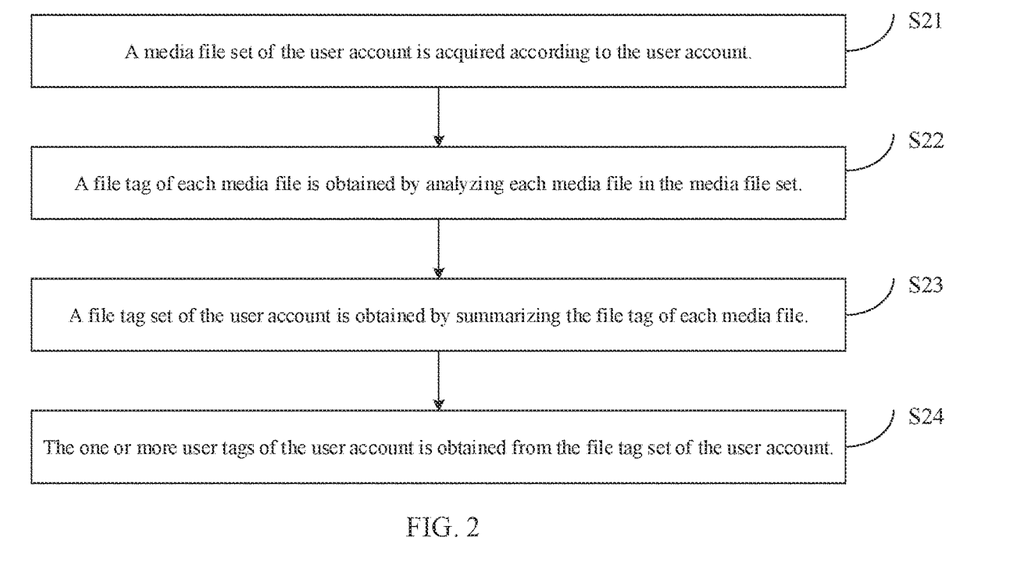
FIG. 2 is a flow chart showing blocks of acquiring user tag of a user account according to example implementations.

As shown in FIG. 2, the block of the acquiring the user tag of the user account may include the following blocks.

In block S21, a media file set of the user account is acquired according to the user account.

In an example implementation of the disclosure, all media file published by the user account may be acquired according to the identifier of user account, or media file, published by the user account, having popularity greater than a preset popularity threshold may be acquired according to the identifier of user account.

When acquiring media file published by the user account and having popularity greater than a preset popularity threshold according to the identifier of user account, first, all the media file published by the user account can be searched and obtained according to the identifier of the user account, and then according to the type and number of interactive operation received by each media file, the popularity of each media file is generated, and further, media file having popularity greater than the preset popularity threshold are combined into a media file set.

When generating the popularity of each media file, the number of interactive operation can be weighted according to a weighting factor corresponding to the type of interactive operation to obtain the popularity of each media file. Specifically, the number of one or more kinds of interactive operation, such as the number of clicking, the number of commenting, the number of sharing, and the number of liking for each media file within a preset time period can be acquired; and then, according to corresponding a weighting factor of the interactive operation such as clicking, commenting, sharing and liking, a weighted summing process is performed on one or more operation parameters including the number of clicking, the number of commenting, the number of sharing and the number of liking to obtain the popularity of each media file.

In block S22, a file tag of each media file is obtained by analyzing each media file in the media file set.

Figure 3:
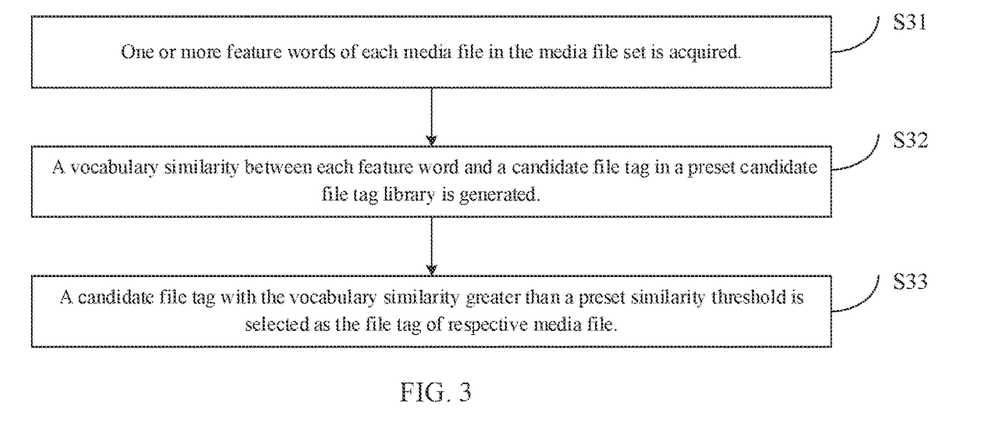
FIG. 3 is a flow chart showing the blocks of acquiring file tag according to example implementations.

In an example implementation of the disclosure, as shown in FIG. 3, the execution process of block S22 may include the following blocks.

In block S31, one or more feature words of each media file in the media file set is acquired.

When acquiring the feature word of a media file, one of the following two methods or a combination of the two methods can be used to acquire the feature word of the media file.

In the first method, file attribute information of each media file is acquired, and the feature word is extracted from the file attribute information. The file attribute information includes at least one of title and content introduction text. According to the method, in the process of extracting the feature word, repeated word and modal particle can be removed, and finally the feature word can be obtained.

In the second method, each media file is recognized based on a pre-trained file recognition model to obtain the feature word.

The file recognition model can be trained and acquired by using image recognition technology based on video streams and deep learning (Deep Learning, DL).

Specific principle of constructing the file recognition model is as follows.

First, each media file (actually, video stream data) is analyzed, and then target object detection may be performed on each frame of image in the video stream data to obtain category and number of the target object in each frame of image, and then behavioral relationship analysis is performed on the target object in consecutive frames of images in the video stream data. In practical applications, for each frame of image in the video stream data, regional proposal network (Region Proposal Networks, RPN) can be used to generate several target object areas of each frame of image, and then a classifier is used to classify the target objects in each target object area, and then it is determined what specific target object is contained in each target object area, and how many target objects are contained. The aforementioned target objects may include but are not limited to: people, food, scenery, clothes, animals, and so on. Next, Recurrent Neural Network (RNN) can be used to perform behavior analysis on the consecutive frames of images. Specifically, Long Short-Term Memory (LSTM) can be used to analyze timing-kinematic behavior relationship between the consecutive frame images to obtain the target objects included in the media file and the behavior relationship between the objects, and attribute and behavior relationship the target objects are processed for word partitioning, and then extracted to obtain the feature word.

When training the file recognition model, media file can be collected as sample file, the feature word of the sample file are manually set to obtain a training set constructed by the sample file. The above principles are used for training until recognition accuracy meets requirements.

In block S32, a vocabulary similarity between each feature word and a candidate file tag in a preset candidate file tag library is generated.

Algorithms such as cosine similarity algorithm can be used to calculate the vocabulary similarity between each feature word and the candidate file tag.

The candidate file tag library can be constructed manually according to specific application scenarios. In addition, each acquired media file can be recognized by the above file recognition model, to obtain the feature word of each media file, and then collected to obtain a feature word set and then the candidate tag library can be constructed by selecting the feature word each having appearance frequency greater than a preset frequency threshold or having frequency ranked in the top N as the candidate file tags.

In block S33, a candidate file tag with a vocabulary similarity greater than a preset similarity threshold is selected as the file tag of respective media file.

According to the implementations of the disclosure, the feature word can be directly extracted from the file attribute information of the media file, and/or the file recognition model can be used to identify the feature word. Then, the vocabulary similarity between the feature word and the candidate file tag is generated, and the candidate file tag with the vocabulary similarity greater than the preset similarity threshold is used as the file tag of the respective media file. The implementations of the disclosure provide multiple ways of acquiring the feature word, taking into account various media files with sufficient file attribute information or lacking file attribute information, and reducing requirements for file attribute information of media file.

In block S23, a file tag set of the user account is obtained by summarizing the file tag of each media file.

When the file tag of each media file is summarized into the file tag set, there is no need to remove duplicate file tag to avoid blurring same media file or similar media file.

In block S24, the one or more user tags of the user account is obtained from the file tag set of the user account.

In an example implementation of the disclosure, the amount of file tag in the file tag set of the user account can be obtained; the file tag of which number meets a preset user tag condition is used as the user tag of the user account. In practical applications, different file tag can correspond to different user tag conditions. For example, when the amount of file tag A is greater than a preset number threshold N, the user account has the user tag A. For another example, when the amount of file tag A is greater than the preset number threshold N, and the amount of file tag B is greater than a preset number threshold M, the user account has user tag B.

According to an implementation of the disclosure, the tag information of which the number meets the user tag conditions can be used as the user tag of the user account, and the tag information of files that meet certain conditions can be selected as the user tag by filtering numerous files tag information of the user account, so that the user tag can more clearly reflect the type of media file of the user account.

In an implementation of the disclosure, one user account may have multiple user tag. Or text content of the user tag can be manually preset.

In some implementations of the disclosure, on one hand, the user tag can be obtained based on all media file in the user account, and on the other hand, the user tag can be obtained based on some media file with popularity greater than the preset popularity threshold. For a user account with a small number of published media file, the user tag can be obtained based on all media file thereof. For a user account with a large number of published media file, the user tag can be obtained based on some media file with popularity greater than the preset popularity threshold. In the implementations of the disclosure, it is possible to select which way to obtain user tag according to the actual number of media file published by the user account, which improves adaptability of obtaining user tag. Also, when obtaining the user tag based on the media file with popularity greater than the preset popularity threshold, different weighting factors can be set for different interactive operations received by the media files, and then the number of interactive operation is weighted according to the weighting factor and thus the popularity is obtained, and the influence of different types of interactive operation on the popularity is considered.

In an example implementation of the disclosure, when the above block S13 is performed, in response to an operation of selecting target user tag from the user tag, associated user account of the user tag with a same identifier as the target user tag may be searched; then a user account recommendation interface is entered from the information page, and the associated user account is displayed on the user account recommendation interface.

Figure 4:
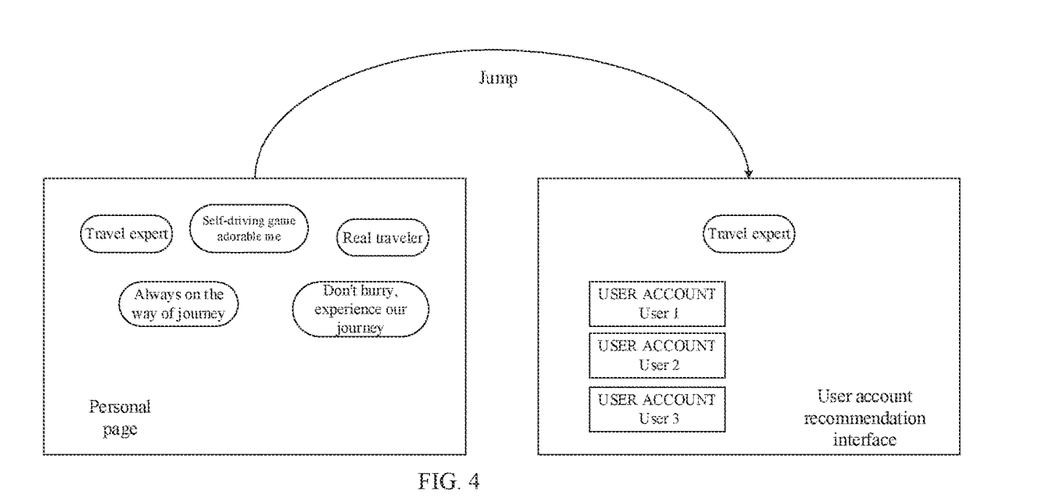
FIG. 4 is a schematic diagram showing a user account recommendation interface according to example implementations.

In some implementations, the user tag of all user accounts can be obtained in advance, and when a certain user tag of the user account is selected, the selected user tag is used as the target user tag. All user accounts with the target user tag are searched. All the searched user accounts are associated user accounts, and information of all the searched user accounts is aggregated and displayed on the user account recommendation interface. For example, as shown in FIG. 4, at the top of the personal page (target information page) of the user account "I am super adorable and I love you," the user tag "travel expert," "self-driving game, adorable me," "real traveler," "always on the way of journey," "Don't hurry, experience our journey" are displayed, and each user tag can displayed to be scrolled on the personal page through default animation. When clicking the user tag "travel expert," it jumps to the user account recommendation interface. On the user account recommendation interface, all other user accounts that have the user tag "travel expert" are aggregated and displayed, such as user account "user 1," user account "user 2," and user account "user 3."

In the implementation of the disclosure, associated user account of the user tag having an identifier identical to the identifier of the target user tag can be searched and obtained, or associated user account of user tag of which the type is same as the target user tag can be searched and obtained, which enriches recommended range of associated user account. Moreover, the associated user account can be displayed on the user account recommendation interface dedicated to display. A special display interface, which is different from the information page, is provided for the associated user account, to avoid the problem of mutual interference caused by the user account and the associated user account being displayed on the same page.

It should be noted that the above description may indicate a method for displaying information on a client. In addition, the method for displaying information can also be implemented through interaction between the client and the server. As mentioned above, when the client acquires the user tag of the user account associated with the information page, tag request, which may include the identifier of the user account, can be sent to the server, and then the user tag returned by the server according to the request information is received. When the client displays the associated user account corresponding to the user tag, account request, which may include the identifier of the target user tag, can be sent to the server, and then the association user account information returned by the server according to the account request can be received.

According to the implementations of the disclosure, the information display solution can be implemented not only by the client alone, but also by the interaction between the client and the server, such that the information display solution can be implemented by the client and the server together. When interacting with the server through the client, the client can send the request information to the server, and the server returns corresponding user tag and/or associated user account according to the request information, which reduces the resource occupation and operating pressure of the client, which can make full use of server-side system resources.

Figure 5:
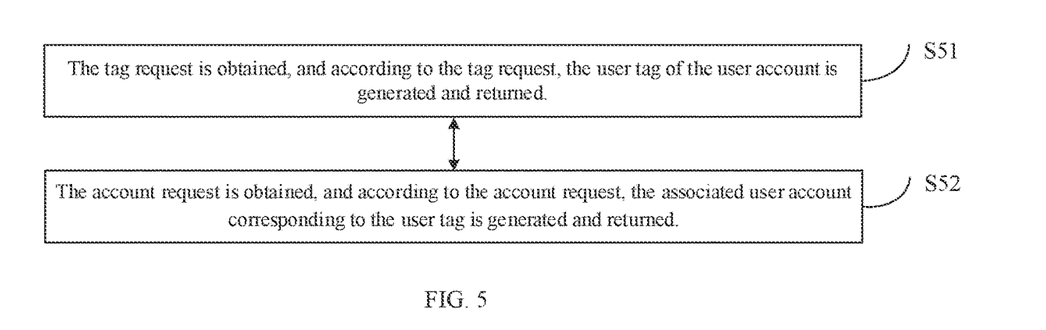
FIG. 5 is a flowchart showing another method for displaying information according to example implementations.

FIG. 5 is a flowchart showing another method for displaying information according to example implementations. As shown in FIG. 5, the method for displaying information can be applied to the server. The server may be a short video application server. The method for displaying information may include one of the following blocks.

In block S51, the tag request is obtained, and according to the tag request, the user tag of the user account is generated and returned.

The tag request may include the identifier of the user account. The execution process of generating and returning the user tag of the user account according to the tag request at block S51 may refer to the relevant description of the above blocks S21 to S24, which will not be repeated here.

In block S52, the account request is obtained, and according to the account request, the associated user account corresponding to the user tag is generated and returned.

The account request may include the identifier of the target user tag in the user tag. The execution process of generating and returning the associated user account corresponding to the user tag according to the account request at block S52 may refer to the relevant description of block S13, which will not be repeated here.

The implementations of the disclosure can also implement a method for displaying information at the server side, the user tag can be generated and returned according to the tag request, and/or generate and return associated user account according to the account request, so as to make full use of server-side system resources, which improves resource utilization of the server side.

Figure 6:
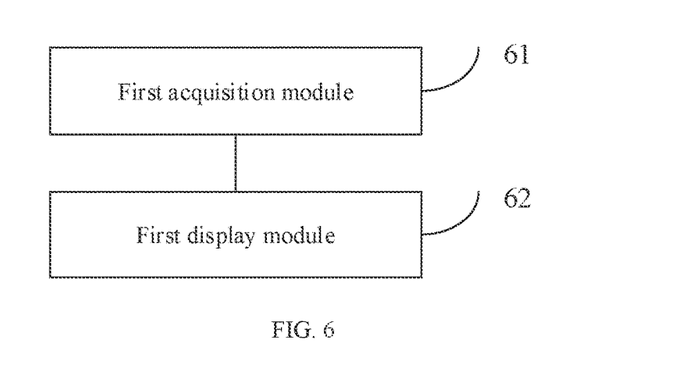
FIG. 6 is a block diagram showing a device for displaying information according to example implementations.

FIG. 6 is a block diagram showing a device for displaying information according to example implementations. The device may be applied to a client, and the device may specifically include the following modules.

A first acquisition module 61 is configured to acquire one or more user tags of a user account associated with the information page in response to a trigger operation on an information page, and the one or more user tags correspond to one or more types of media file of the user account.

A first display module 62 is configured to display one or more the user tags of the user account on the information page.

The first display module 62 is further configured to display associated user account corresponding to a target user tag in response to an operation of selecting the target user tag from the one or more user tags.

In an example implementation of the disclosure, the first acquisition module 61 includes: a file set acquisition module, configured to acquire, according to an identifier of the user account, a media file set of the user account; a file analysis module, configured to obtain, by analyzing each media file in the media file set, file tag of each media file; a tag set summarizing module, configured to obtain, by summarizing the file tag of each media file, a file tag set of the user account; a tag set processing module, configured to obtain, by processing the set of file tag of the user account, the user tag of the user account.

In an example implementation of the disclosure, the file set acquisition module includes: a file search module, configured to search for all media files published by the user account according to an identifier of the user account; a file popularity generation module, configured to generate the popularity of each media file according to the type and number of interactive operation received by each media file; a file set determination module, configured to combine the media files having popularity greater than the preset popularity threshold as the media file set.

In an example implementation of the disclosure, the file popularity generation module is configured to: obtain the popularity of each media file by performing a weighting processing on the number of interactive operation according to a weighting factor corresponding to the type of the interactive operation.

In an example implementation of the disclosure, the file popularity generation module includes: an interaction number acquisition module, configured to acquire one or more operation parameters including the number of clicking, the number of commenting, the number of sharing, and the number of liking within a preset time period of each media file; a weighting processing module, configured to perform, according to the respective weighting factors corresponding to the clicking, the commenting, the sharing, and the liking, weighting and summing process on one or more operation parameters including the number of clicking, the number of commenting, the number of sharing, and the number of liking to obtain the popularity of each media file.

In an example implementation of the disclosure, the file analysis module includes: a feature acquisition module, configured to acquire a feature word of each media file in the media file set; a similarity generation module, configured to generate vocabulary similarity between each of the feature word with the candidate file tags in the preset candidate file tag library; a file tag determination module, configured to select the candidate file tags with the vocabulary similarity greater than the preset similarity threshold as the file tag of respective media file.

In an example implementation of the disclosure, the feature acquisition module is configured to: acquire file attribute information of each media file, and extract the feature word from the file attribute information, the file attribute information including at least one of a title and content introduction text; and/or, obtain the feature word by recognizing each media file based on a pre-trained file recognition model;

In an example implementation of the disclosure, the tag set processing module includes: a tag number acquisition module, configured to acquire the number of tag information of each file in the file tag set of the user account; a user tag determination module, configured to select the file tag whose number meets a preset user tag condition as the user tag of the user account.

In an example implementation of the disclosure, the first display module 62 is configured to: search for associated user account having user tag of which the identifier is the same to the identifier of the target user tag, and display the associated user account corresponding to the user tag.

In an example implementation of the disclosure, the first display module 62 is configured to cause the user account recommendation interface to be entered from the information page, and display the associated user account on the user account recommendation interface.

In an example implementation of the disclosure, the first acquisition module 61 includes: a tag request sending module, configured to send tag request to a server, the tag request including the identifier of the user account; a user tag receiving module, configured to receive the user tag returned by the server according to the tag request.

In an example implementation of the disclosure, the first display module 62 includes: an account request sending module, configured to send account request to the server, the account request including an identifier of the target user tag; a user account receiving module, configured to receive the associated user account returned by the server side according to the account request.

According to implementations of the disclosure, a client is further provided, which may include some or all of the modules of the device for displaying information as shown in FIG. 6.

Figure 7:
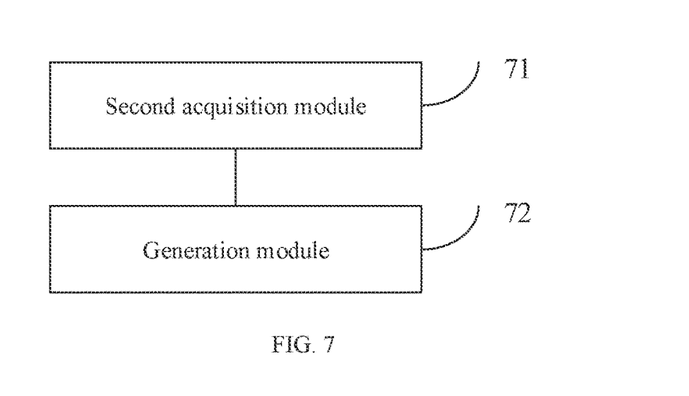
FIG. 7 is a block diagram showing another device for displaying information according to example implementations.

FIG. 7 is a block diagram showing another information display device according to example implementations. The device may be applied to the server, and the device may specifically include the following modules.

A second acquisition module 71, configured to acquire tag request including an identifier of a user account; a generation module 72, configured to generate and return one or more user tags of the user account according to the tag request;

Or, the second acquisition module 71, configured to acquire account request including an identifier of target user tag in the user tag; and the generation module 72, further configured to generate and return associated user account corresponding to the user tag according to the account request.

In an example implementation of the disclosure, the generation module 72 includes: a file set acquisition module, configured to acquire, according to an identifier of the user account, a media file set of the user account; a file analysis module, configured to obtain, by analyzing each media file in the media file set, file tag of each media file; a tag set summarizing module, configured to obtain, by summarizing the file tag of each media file, a file tag set of the user account; a tag set processing module, configured to obtain, by processing the file tag set of the user account, the user tag of the user account.

In an example implementation of the disclosure, the file set acquisition module includes: a file search module, configured to search for all media files published by the user account according to an identifier of the user account; a file popularity generation module, configured to generate the popularity of each media file according to the type and number of interactive operation received by each media file; a file set determination module, configured to combine the media files having popularity greater than the preset popularity threshold into the media file set.

In an example implementation of the disclosure, the file popularity generation module is configured to perform weighting processing on the number of interactive operation according to a weighting factor corresponding to the type of the interactive operation, to obtain the popularity of each media file.

In an example implementation of the disclosure, the file popularity generation module includes: an interaction number acquisition module, configured to acquire one or more operation parameters including the number of clicking, the number of commenting, the number of sharing, and the number of liking within a preset time period of each media file; a weighting processing module, configured to perform weighting and summing process on one or more operation parameters including the number of clicking, the number of commenting, the number of sharing, and the number of liking to obtain the popularity of each media file according to the respective weighting factors corresponding to the clicking, the commenting, the sharing, and the liking.

In an example implementation of the disclosure, the file analysis module includes: a feature acquisition module, configured to acquire a feature word of each media file in the media file set; a similarity generation module, configured to generate vocabulary similarity between each of the feature word with the candidate file tags in the preset candidate file tag library; a file tag determination module, configured to select the candidate file tags with the vocabulary similarity greater than the preset similarity threshold as the file tag of respective media file.

In an example implementation of the disclosure, the feature acquisition module is configured to acquire file attribute information of each media file, and extract the feature word from the file attribute information, the file attribute information including at least one of a title and content introduction text; and/or, recognize, based on a pre-trained file recognition model, each media file and obtain the feature word.

In an example implementation of the disclosure, the tag set processing module includes: a tag number acquisition module, configured to acquire the number of tag information of each file in the file tag set of the user account; a user tag determination module, configured to select the file tag whose number meets a preset user tag conditions as the user tag of the user account.

In an example implementation of the disclosure, the generation module 72 is configured to search for associated user account having user tag of which the identifier is the same to the identifier of the target user tag.

The implementation of the disclosure also provides a server, which may include some or all of the modules of the information display device as shown in FIG. 7.

Regarding the devices in the above implementations, specific manners in which each module performs operation has been described in detail in the implementations of the method, and detailed description will not be given here.

Figure 8:
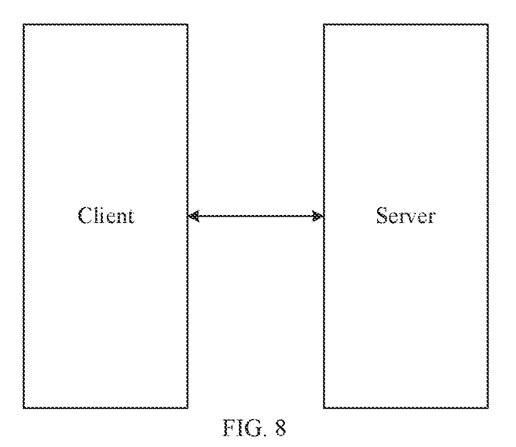
FIG. 8 is a schematic structural diagram showing a system for displaying information according to example implementations.
Figure 9:
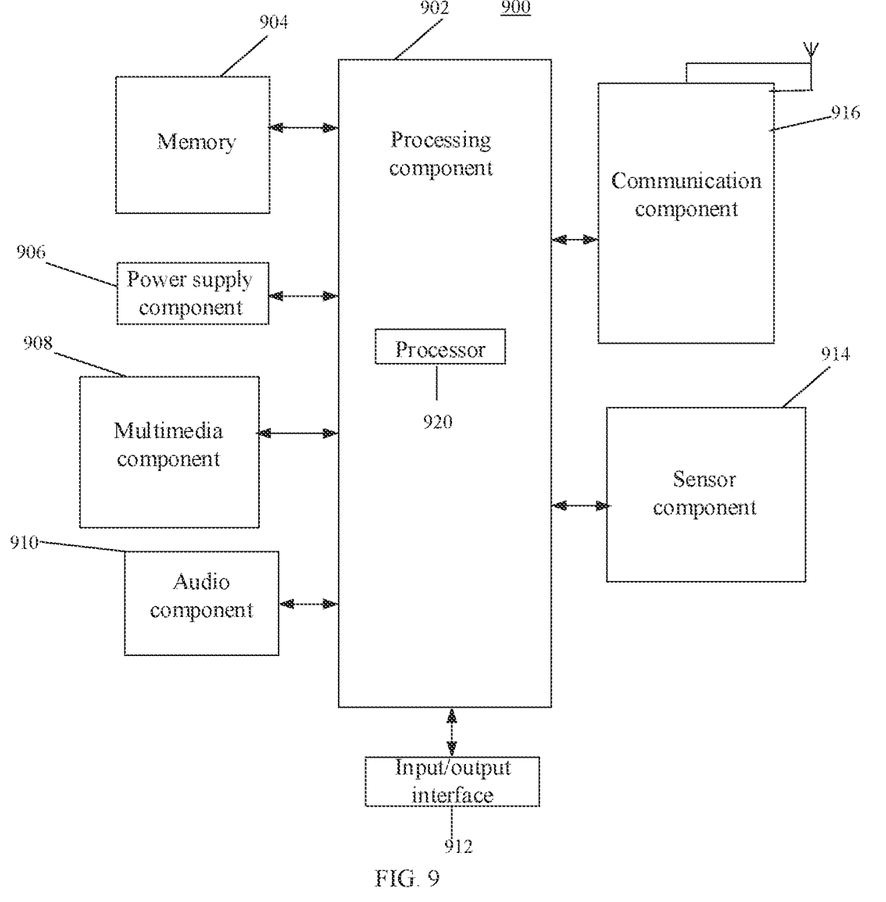
FIG. 9 is a block diagram showing an electronic device for displaying information according to example implementations.

FIG. 8 is a schematic structural diagram showing a system for displaying information according to example implementations. The system may include a client and a server, and the server and the client may have a structure as shown in FIG. 9. The client may include parts or all of the modules of the information display device as shown in FIG. 6, and the server may include part or all of the modules of the information display device as shown in FIG. 7. In practical applications, when the system for displaying information is used to implement the above methods for displaying information, a user of the client can perform a trigger operation on an information page of a short video application on the client, and the client may send tag request to the server in response to the trigger operation. The tag request contains an identifier of a user account associated with the information page. For example, the information page s0*l* may be a page of the user account "user 11" for displaying its user tag. After receiving the tag request, the server can obtain the user tag of the user account according to the tag request, and specifically can obtain the user tag of the user account according to the identifier of the user account carried in the tag request. The specific execution process of obtaining user tag at the server side may refer to the above descriptions of block S51, block S21 to block S24, which will not be repeated here.

After obtaining the user tag of the user account, the server returns the user tag to the client. The client displays the user tag received from the server on the information page. In this way, the client and server in the system for displaying information have realized the function of displaying the user tag of the user account.

Further, the user of the client can select the target user tag from at least one of user tag of the user account, and the client can send the account request to the server in response to the selection operation. The account request may include the identifier of the target user tag. After receiving the account request, the server can acquire the associated user account corresponding to the user tag according to the account request. Specifically, the associated user account can be acquired according to the identifier of the target user tag carried in the account request. The specific execution process of obtaining the associated user account on the server side, may refer to the relevant descriptions of the above block S52 and block S13, which will not be repeated here. In this way, the client and server in the system for displaying information have realized the function of displaying the associated user account that has the same target user tag as the user account.

FIG. 9 is a block diagram showing an electronic device for displaying information 900 according to example implementations. For example, the electronic device 900 may be a mobile phone, a computer, a digital broadcasting terminal, a messaging device, a game console, a tablet device, a medical device, a fitness device, a personal digital assistant, etc.

Referring to FIG. 9, the electronic device 900 may include one or more of the following components: a processing component 902, a memory 904, a power component 906, a multimedia component 908, an audio component 910, an input/output (I/O) interface 912, and a sensor component 914, and a communication component 916.

The processing component 902 generally controls overall operations of the electronic device 900, such as operation associated with display, telephone calls, data communication, camera operation, and recording operation. The processing component 902 may include one or more processors 920 to execute instructions to complete all or parts of the blocks of the foregoing methods. In addition, the processing component 902 may include one or more modules to facilitate the interaction between the processing component 902 and other components. For example, the processing component 902 may include a multimedia module to facilitate the interaction between the multimedia component 908 and the processing component 902.

The memory 904 is configured to store various types of data to support operation on the electronic device 900. Examples of these data include instructions for any application or method operating on the electronic device 900, contact data, phone book data, messages, images, videos, etc. The memory 904 can be implemented by any type of volatile or non-volatile storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 906 provides power to various components of the electronic device 900. The power supply component 906 may include a power management system, one or more power supplies, and other components associated with the generation, management, and distribution of power for the electronic device 900.

The multimedia component 908 includes a screen that provides an output interface between the electronic device 900 and the user. In some implementations, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense a boundary of the touching or sliding action, but also detect duration and pressure related to the touching or sliding operation. In some implementations, the multimedia component 908 includes a front camera and/or a rear camera. When the electronic device 900 is in an operation mode, such as a shooting mode or a video mode, the front camera and/or the rear camera can receive external multimedia data. Each front camera and rear camera can be a fixed optical lens system or have focal length and optical zoom capabilities.

The audio component 910 is configured to output and/or input audio signals. For example, the audio component 910 includes a microphone (MIC). When the electronic device 900 is in an operation mode, such as a calling mode, a recording mode, and a voice recognition mode, the microphone is configured to receive an external audio signal. The received audio signal may be further stored in the memory 904 or transmitted via the communication component 916. In some implementations, the audio component 910 further includes a speaker for outputting audio signals.

The I/O interface 912 provides an interface between the processing component 902 and a peripheral interface module. The peripheral interface module may be a keyboard, a click wheel, buttons, and the like. These buttons may include but are not limited to: home button, volume button, start button, and lock button.

The sensor component 914 includes one or more sensors for providing the electronic device 900 with various aspects of state evaluation. For example, the sensor component 914 can detect the on/off state of the electronic device 900 and the relative positioning of the components. For example, the component may be a display and a keypad of the electronic device 900. The sensor component 914 can further detect the electronic device 900 or position change of the component the electronic device 900, presence or absence of contact between the user and the electronic device 900, orientation or acceleration/deceleration of the electronic device 900, and temperature change of the electronic device 900. The sensor component 914 may include a proximity sensor configured to detect presence of nearby objects when there is no physical contact. The sensor component 914 may further include a light sensor, such as a CMOS or CCD image sensor, for use in imaging applications. In some implementations, the sensor component 914 may further include an acceleration sensor, a gyroscope sensor, a magnetic sensor, a pressure sensor or a temperature sensor.

The communication component 916 is configured to facilitate wired or wireless communication between the electronic device 900 and other devices. The electronic device 900 can access a wireless network based on a communication standard, such as WiFi, an operator network (such as 2G, 3G, 4G, or 5G), or a combination thereof. In an example implementation, the communication component 916 receives a broadcast signal or broadcast related information from an external broadcast management system via a broadcast channel. In an example implementation, the communication component 916 may further include a near field communication (NFC) module to facilitate short-range communication. For example, the NFC module can be implemented based on radio frequency identifier (RFID) technology, infrared data association (IrDA) technology, ultra-wideband (UWB) technology, Bluetooth (BT) technology and other technologies.

In an example implementation, the electronic device 900 can be implemented by one or more application specific integrated circuits (ASIC), digital signal processors (DSP), digital signal processing devices (DSPD), programmable logic devices (PLD), field programmable gate array (FPGA), controller, microcontroller, microprocessor, or other electronic components are implemented to perform the above methods.

In an example implementation, a storage medium including instructions is also provided, for example, the memory 904 including instructions, and the foregoing instructions may be executed by the processor 920 of the electronic device 900 to complete the foregoing method. Alternatively, the storage medium may be a non-transitory computer-readable storage medium, for example, the non-transitory computer-readable storage medium may be ROM, random access memory (RAM), CD-ROM, magnetic tape, floppy disk, and optical data storage equipment etc.

In an example implementation, a computer program product is further provided. The computer program product includes readable program code, and the readable program code can be executed by the processor 920 of the electronic device 900 to complete the foregoing methods. In some implementations, the program code may be stored in a storage medium of the electronic device 900, and the storage medium may be a non-transitory computer-readable storage medium. For example, the non-transitory computer-readable storage medium may be ROM, random access Memory (RAM), CD-ROM, magnetic tape, floppy disk and optical data storage device, etc.

Figure 10:
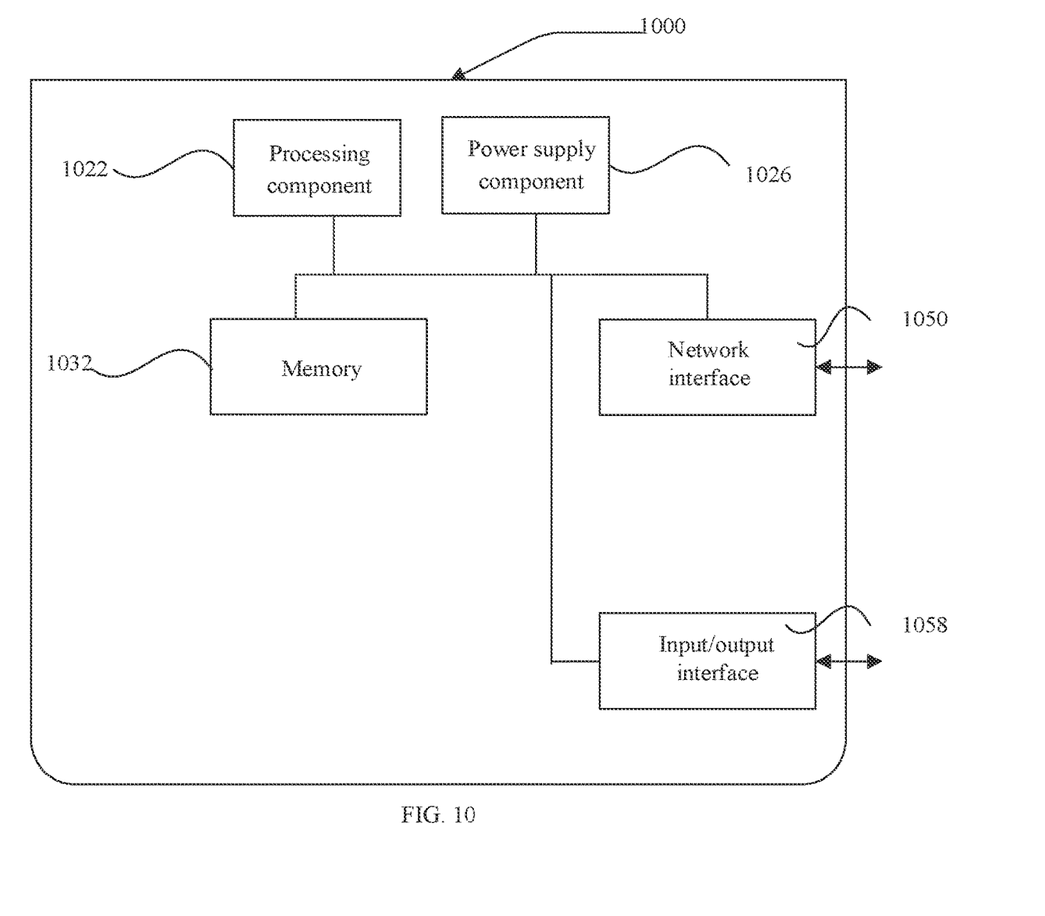
FIG. 10 is a block diagram showing an electronic device for displaying information according to example implementations.

FIG. 10 is a block diagram showing an electronic device 1000 for displaying information according to example implementations. For example, the electronic device 1000 may be provided as a server. Referring to FIG. 10, the electronic device 1000 includes a processing component 1022, which further includes one or more processors, and a memory resource represented by a memory 1032 for storing instructions (such as an application program) executable by the processing component 1022. The application program stored in the memory 1032 may include one or more modules each corresponding to a set of instructions. In addition, the processing component 1022 is configured to execute instructions to execute the foregoing methods for displaying information.

The electronic device 1000 may further include a power supply component 1026 configured to perform power management of the electronic device 1000, a wired or wireless network interface 1050 configured to connect the electronic device 1000 to the network, and an input output (I/O) interface 1058. The electronic device 1000 can operate based on an operating system stored in the memory 1032, such as Windows Server™, Mac OS X™, Unix™, Linux™, FreeBSD™ or the like.

Those skilled in the art will easily think of other implementations of the disclosure after considering the description and practicing the implementations disclosed herein. This application is intended to cover any variations, uses, or adaptive changes of the disclosure. These variations, uses, or adaptive changes follow the general principles of the disclosure and include common knowledge or conventional technical means in the technical field not disclosed in the disclosure. The description and the implementations are only regarded as example, and the true scope and spirit of the disclosure are pointed out by the attached claims.

It should be understood that the disclosure is not limited to the precise structure that has been described above and shown in the drawings, and various modifications and changes can be made without departing from the scope thereof. The scope of the disclosure is only defined by the appended claims.

What is claimed is:

1. A method for displaying information, comprising:
   acquiring one or more user tags of a user account associated with an information page, in response to a trigger operation on the information page, wherein the one or more user tags correspond to one or more types of media files published by the user account;
   wherein the acquiring includes acquiring a media file set specific to the user account based on one or more media files that published by the user account, obtaining a file tag set from analyzing each media file in the media file set, and obtaining the one or more user tags of the user account from the file tag set of the user account;
   displaying the one or more user tags on the information page; and
   displaying an associated user account corresponding to a target user tag in response to an operation of selecting the target user tag from the displayed one or more user tags.

2. The method according to claim 1, wherein said acquiring one or more the user tags of the user account associated with the information page further comprises:
   obtaining a file tag of the each media file by analyzing each media file in the media file set; and
   obtaining the file tag set of the user account by summarizing the file tag of the each media file.

3. The method according to claim 2, wherein said acquiring the media file set of the user account according to the user account further comprises:
   obtaining popularity of each media file according to a type and number of interactive operations received by the each media file; and
   obtaining the media file set, wherein the popularity of each media file in the media file set is greater than a preset popularity threshold.

4. The method according to claim 3, wherein said obtaining the popularity of each media file according to the type and number of the interactive operations received by the each media file further comprises:
   obtaining, by performing a weighting process on the number of the interactive operations according to a weighting factor corresponding to the type of the interactive operations, the popularity of each media file.

5. The method according to claim 4, wherein said obtaining, by performing the weighting process on the number of the interactive operations according to a weighting factor corresponding to the type of the interactive operations, the popularity of each media file further comprises:
   acquiring one or more operation parameters, wherein the one or more operation parameters include a number of clicking, a number of commenting, a number of sharing, and a number of liking within a preset time period of each media file; and
   obtaining the popularity of the each media file by forming a weighting and summing process on the one or more operation parameters according to the respective weighting factors corresponding to the one or more operation parameters.

6. The method according to claim 2, wherein said obtaining the file tag of the each media file by analyzing the each media file in the media file set, further comprises:
   acquiring one or more feature words of the each media file in the media file set;
   generating vocabulary similarity between each feature word and a candidate file tag in a preset candidate file tag library; and
   selecting the candidate file tag with the vocabulary similarity greater than a preset similarity threshold as the file tag of respective media file.

7. The method according to claim 6, wherein said acquiring one or more feature words of the each media file in the media file set further comprises at least one of the following blocks:
   acquiring file attribute information of the each media file, and extracting the one or more feature words from the file attribute information having at least one of a title and content introduction text; and
   obtaining, by recognizing the each media file based on a pre-trained file recognition model, the one or more feature words.

8. The method according to claim 1, wherein said obtaining the one or more user tags of the user account from the file tag set of the user account further comprises:
   acquiring the number of respective file tag in the file tag set of the user account; and
   selecting the file tag whose number meets a preset user tag condition as the one or more user tag of the user account.

9. The method according to claim 1, wherein said displaying, the associated user account corresponding to the target user tag in response to the operation of selecting the target user tag from the displayed one or more user tags, further comprises:
   obtaining the associated user account with a user tag the same as the target user tag, and displaying the associated user account corresponding to the user tag.

10. The method according to claim 1, wherein said acquiring one or more user tags of the user account associated with the information page further comprises:
    sending tag request to a server, the tag request including an identifier of the user account; and
    receiving the one or more user tags returned by the server side based on the tag request.

11. The method according to claim 1, wherein said displaying the associated user account corresponding to the target user tag further comprises:
    sending account request to the server, the account request having an identifier of the target user tag; and
    receiving the associated user account returned by the server based on the account request.

12. An electronic device, comprising:
    one or more processors; and
    a memory for storing processor-executable instructions,
    wherein, the one or more processors are configured to execute the instructions to perform operations comprising:
    acquiring one or more user tags of a user account associated with an information page, in response to a trigger operation on the information page, wherein the one or more user tags correspond to one or more types of media files published by the user account;
    wherein the acquiring includes acquiring a media file set specific to the user account based on one or more media files that published by the user account, obtaining a file tag set from analyzing each media file in the media file set, and obtaining the one or more user tags of the user account from the file tag set of the user account;

displaying the one or more user tags on the information page; and displaying an associated user account corresponding to a target user tag in response to an operation of selecting the target user tag from the displayed one or more user tags.

13. The electronic device according to claim 12, wherein said acquiring one or more the user tags of the user account associated with the information page further comprises:

obtaining a file tag of the each media file by analyzing each media file in the media file set; and obtaining the file tag set of the user account by summarizing the file tag of the each media file.

14. The electronic device according to claim 13, wherein said acquiring the media file set of the user account according to the user account further comprises:

obtaining popularity of each media file according to a type and number of interactive operations received by the each media file; and obtaining the media file set, wherein the popularity of each media file in the media file set is greater than a preset popularity threshold.

15. The electronic device according to claim 13, wherein said obtaining the file tag of the each media file by analyzing the each media file in the media file set, further comprises:

acquiring one or more feature words of the each media file in the media file set;

generating vocabulary similarity between each feature word and a candidate file tag in a preset candidate file tag library; and selecting the candidate file tag with the vocabulary similarity greater than a preset similarity threshold as the file tag of respective media file.

16. The electronic device according to claim 13, wherein said obtaining the one or more user tags of the user account from the file tag set of the user account further comprises:

acquiring the number of respective file tag in the file tag set of the user account;

selecting the file tag whose number meets a preset user tag condition as the one or more user tag of the user account.

17. The electronic device according to claim 12, wherein said acquiring one or more user tags of the user account associated with the information page further comprises:

sending tag request to a server, the tag request including an identifier of the user account; and receiving the one or more user tags returned by the server side based on the tag request.

18. The electronic device according to claim 12, wherein said displaying the associated user account corresponding to the target user tag further comprises:

sending account request to the server, the account request having an identifier of the target user tag; and receiving the associated user account returned by the server based on the account request.

19. A system for displaying information, comprising: a client and a server, wherein the client comprises:

one or more client processors;

a client memory for storing processor-executable instructions;

wherein, the one or more client processors are configured to execute the instructions to perform operations comprising:

acquiring one or more user tags of a user account associated with an information page, in response to a trigger operation on the information page, wherein the one or more user tags correspond to one or more types of media files published by the user account;

wherein the acquiring includes acquiring a media file set specific to the user account based on one or more media files that published by the user account, obtaining a file tag set from analyzing each media file in the media file set, and obtaining the one or more user tags of the user account from the file tag set of the user account;

displaying the one or more user tags on the information page; and displaying associated user account corresponding to a target user tag in response to an operation of selecting the target user tag from the displayed one or more user tags; and wherein the server comprises:

one or more server processors;

one or more server memory for storing processor-executable instructions;

wherein, the one or more server processors are configured to execute the instructions to perform operations comprising:

acquiring tag request including an identifier of a user account, and generating and returning one or more user tags of the user account according to the tag request; or, acquiring account request including an identifier of a target user tag in the one or more user tags, and generating and returning an associated user account corresponding to the user tag according to the account request.

20. The system according to claim 19, wherein said acquiring one or more the user tags of the user account associated with the information page further comprises:

obtaining a file tag of the each media file by analyzing each media file in the media file set; and obtaining the file tag set of the user account by summarizing the file tag of the each media file.

* * * * *